Figures 2, 5:
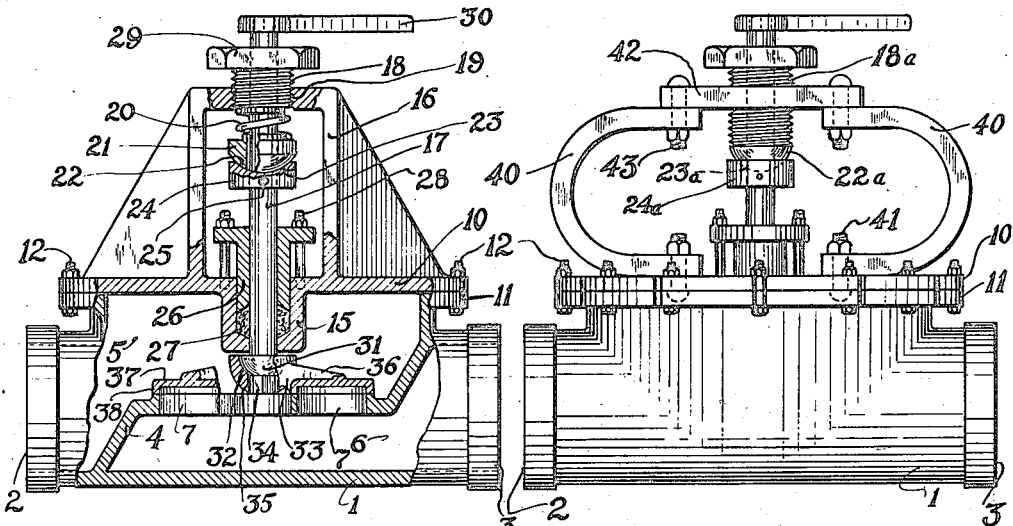

Nov. 6, 1923.

T. COSGROVE, JR

DISK VALVE

Filed March 30, 1921

1,473,282

Inventor
Thomas Cosgrove, Jr.

BY *Frease, Merkel, Saywell and Bond*
Attorneys

Patented Nov. 6, 1923.

1,473,282

UNITED STATES PATENT OFFICE.

THOMAS COSGROVE, JR., OF CANTON, OHIO.

DISK VALVE.

Application filed March 30, 1921. Serial No. 456,819.

*To all whom it may concern:*

Be it known that I, THOMAS COSGROVE, Jr., a citizen of the United States, residing at Canton, in the county of Stark and State of Ohio, have invented a new and useful Disk Valve, of which the following is a specification.

This invention relates to valves and more particularly to a quick opening and closing disk valve especially adaptable for use in a fluid line and arranged to be operated from the exterior of the valve casing.

The objects of the invention are to provide a valve of the disk type which will permit of quick and easy operation of the valve from the exterior and in which suitable packing is provided to prevent leakage around the valve stem; to provide a valve of this character comprising a plurality of disks connected to a single valve stem and arranged to be simultaneously operated in conjunction with separate valve seats, each valve disk and seat being provided with an annular lip or flange to assure proper seating of the disks and to automatically clean the engaging surfaces of the disks and valve seats by the opening and closing movement of the valve; means being provided for adjusting the compression upon the valve to cause the same to properly seat upon the valve seats when moved to the closed position; other objects being to generally simplify and improve the construction of valves of this type.

The above and other objects may be attained by providing a valve casing having a partition wall therethrough, three spaced ports being provided in said wall and surrounded by annular lips or flanges forming valve seats, similar lips or flanges being provided between said ports, all of the valve seats thus provided being located in a circle, the valve stem being located through a suitable stuffing box in the casing and being concentric with said valve seats and having a head mounted upon its inner extremity as by a ball and socket connection, said head having three disks thereon, each provided with an annular lip or flange arranged to be normally seated upon one of the valve seats, spring means being provided for urging the valve head normally toward the valve seats, means being provided upon the exterior of the casing for rotating the valve stem and head in order to move the disks into engagement with the valve seats surrounding the ports or into engagement with the seats located between the ports.

With these objects in view, the invention consists in the construction and arrangement of parts hereinafter described, and illustrated in the accompanying drawing, it being understood that changes in the proportion and details of construction may be made within the scope of the appended claims.

The invention thus set forth in general terms is illustrated in the accompanying drawings, in which—

Figures 1, 3:
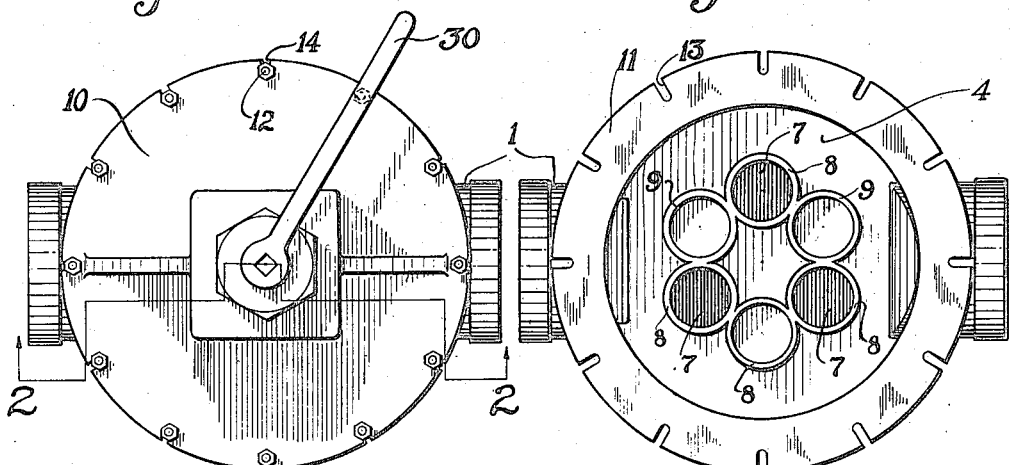
Figure 6:
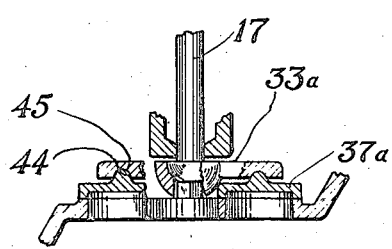
Figure 7:
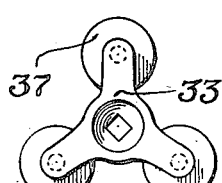
Figure 4:
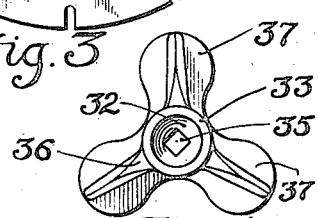

Figure 1 is a plan view of a valve embodying the invention;

Fig. 2, a section on the line 2—2, Fig. 1;

Fig. 3, an interior view of the valve casing with the cover plate and valve removed;

Fig. 4, a plan view of the valve head;

Fig. 5, a side elevation of a valve embodying the invention, showing a slightly modified form of compression means;

Fig. 6, a fragmentary sectional view of a portion of a valve and casing showing a modified form of valve head; and Fig. 7, a plan view of the same.

Similar numerals of reference indicate corresponding parts throughout the several figures of the drawing.

Referring first to the construction illustrated in Figs. 1 to 4 inclusive, the valve casing is preferably cylindrical in shape as indicated at 1, and provided with the inlet and outlet necks 2 and 3 respectively, located at opposite sides of the casing, a partition wall 4 being located through the interior of the casing and dividing the same into the inlet chamber 5 and outlet chamber 6 communicating with the necks 2 and 3 respectively.

The wall 4 is provided with spaced ports 7, located in a concentric circle, an upwardly disposed annular flange 8 being provided around each of said ports forming a valve seat. Similar annular flanges 9 are located between the valve seats thus formed, there being no opening, however, within each of these flanges.

The cover plate 10 of the valve casing may be connected to the annular flange 11 of the casing as by the bolts 12 or the like located through registering slots 13 and 14 in the flange and cover plate respectively.

A concentric, depending stuffing box 15 is formed integral with the cover plate and the upwardly disposed arch or yoke 16 is preferably formed thereon above said stuffing box.

The valve stem 17 is journaled through the threaded bushing 18 which engages internal threads 19 in the arch or yoke 16, a coil spring 20 being interposed between the lower end of said bushing and the thimble 21 which is slidably and rotatably mounted upon the valve stem and provided with a clearance. The semi-spherical portion 22 upon said thimble is received in the socket 23 of the collar 24 which is fixed upon the valve stem as by the pin 25.

The valve stem extends through the stuffing box, the bushing 26 being located around the valve stem and held within the stuffing box to compress the packing 27, by means of the bolts 28. The threaded bushing 18 is provided with a hexagonal portion 29 for the reception of a wrench or other tool, in order that the bushing may be adjusted to place the proper tension upon the spring 20, and the operating handle 30 is provided upon the upper end of the valve stem 17 for rotating the same.

The lower end of the valve stem is provided with a ball portion 31 which engages the socket 32 in the valve head, indicated generally at 33. A shank having one or more flat sides such as shown at 34 is provided upon the valve stem for engagement with the similar shaped aperture 35 in the valve head, in order that the head may be rotated with the valve stem, a slight clearance being provided between said shank and the aperture.

The valve head is provided with the three radial ribs 36, a disk 37 being located upon the under side of each rib and provided with the depending annular flange 38 of the same circumference as the flanges 8 and 9, and arranged to be seated thereon.

When the valve is in the closed position, the disks 37 are located over the ports 7, the flanges 38 upon said disks resting upon the valve seats 8, closing the ports and preventing the passage of fluid from the inlet chamber 5 to the outlet chamber 6.

When it is desired to open the valve, the handle 30 is turned, turning the valve head through the stem until the disks 37 are moved into engagement with the annular flanges 9, the flanges 38 of the disks resting upon the flanges 9.

The spring pressure upon the valve head is sufficient to hold the flanges of the valve disks in tight engagement with the flanges 8 or 9 and as three equally spaced disks are provided, the ball and socket connections between the valve head and the stem causes the pressure to be evenly distributed, causing each valve disk to seat solidly upon the adjacent valve seat 8 or annular flange 9, depending upon the position of the valve.

In Fig. 5 is shown a slightly modified form of the invention, all of the parts being the same as shown in Figs. 1 to 4 inclusive with the exception of the means for producing pressure upon the valve stem. In this form of the invention a pair of U-shaped spring arms 40 are connected to the cover plate as by the bolts 41, the upper ends thereof being connected together by a plate 42 attached to each spring as by the bolts 43. The threaded bushing 18$^a$ is located through the plate 42 and engages the half round thimble 22$^a$ which is received within the socket 23$^a$ formed in the collar 24$^a$.

In Figs. 6 and 7 is illustrated a slightly modified form of the valve proper in which the head 33$^a$ is connected to the stem 17 in the usual manner, each disk 37$^a$ being separate and provided with a ball portion 44 which is received in the socket 45 in the valve head. With this form of valve the danger of the disks not seating squarely is reduced to a minimum, as each disk is movable within the adjacent socket of the valve head independently of the other disks.

It will be evident from the above and the accompanying drawings that a valve is provided which may be quickly and easily operated to move the valve to the full open or full closed position in a single quick movement. The valve disks being provided with the annular flanges arranged to seat upon the annular valve seats 8 when in the closed position, and upon the annular flanges 9 when in the open position, permits each disk to fit tightly upon its seat and allows any dirt or foreign matter which may be deposited upon the valve seat or the surface of the disk to be wiped therefrom and deposited within the annular flange 9 or within the port 7 as the valve is moved, thus preventing foreign matter from causing any difficulty in the seating of the valve.

I claim:—

1. A valve including a casing provided with inlet and outlet openings, a partition dividing the casing into inlet and outlet chambers, said partition having ports therein, a rotatable valve head, disks upon said head arranged to seat over said ports and a valve stem extending through the casing and connected to the valve head by a ball and socket joint.

2. A valve of the character described in claim 3 including means upon the exterior of the casing for urging the valve stem against the valve head.

3. A valve of the character described in claim 3 including a packing box in the casing through which the valve stem is located.

4. A valve including a casing provided with inlet and outlet openings, a partition dividing the casing into inlet and outlet chambers, said partition having at least three ports therein, an annular flange around each port forming a valve seat, similar annular flanges between the ports, a rotatable valve head, disks upon said valve head having annular flanges arranged to seat upon the annular flanges upon the partition, said disks being equal in number to said ports, said head having a central, half round socket terminating in a squared opening, a rotatable valve stem extending through the casing and provided with a ball seated in said socket and having a squared shank entering said squared opening in the head, and means upon the exterior of the casing for urging the valve stem against the valve head.

5. A valve including a casing provided with inlet and outlet openings, a partition dividing the casing into inlet and outlet chambers, said partition having at least three ports therein, an annular flange around each port forming a valve seat, similar annular flanges between the ports, a rotatable valve head, disks upon said valve head having annular flanges arranged to seat upon the annular flanges upon the partition, said disks being equal in number to said ports, said head having a central, half round socket terminating in a squared opening, a rotatable valve stem extendnig through the casing and provided with a ball seated in said socket and having a squared shank entering said squared opening in the head, means upon the exterior of the casing for urging the valve stem against the valve head, and ball and socket connections between said disks and the valve head.

In testimony that I claim the above I have hereunto subscribed my name.

THOMAS COSGROVE, Jr.